(12) United States Patent
Shah et al.

(10) Patent No.: US 8,903,224 B1
(45) Date of Patent: Dec. 2, 2014

(54) METHOD AND APPARATUS FOR DEFINING AN EVENT SCHEDULE

(75) Inventors: Abhishek Shah, Delhi (IN); Sharad Baliyan, Gujarat (IN); P B Ramesh, Noida (IN); Ram Narain Yadav, Greater Noida (IN); Brajesh Kumar, Ghaziabad (IN); Sarandeep Singh, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 359 days.

(21) Appl. No.: 13/312,251

(22) Filed: Dec. 6, 2011

(51) Int. Cl.
*G11B 27/00* (2006.01)

(52) U.S. Cl.
USPC .......................................................... 386/278

(58) Field of Classification Search
CPC .. G11B 27/034; G11B 2220/90; G11B 27/34; G11B 27/105; H04N 9/8042
See application file for complete search history.

(56) References Cited

U.S. PATENT DOCUMENTS

| | | | | |
|---|---|---|---|---|
| 7,369,164 B2* | 5/2008 | Parulski et al. | .......... | 348/231.99 |
| 7,480,864 B2* | 1/2009 | Brook et al. | .................. | 715/720 |
| 2005/0034077 A1* | 2/2005 | Jaeger | .......................... | 715/732 |

FOREIGN PATENT DOCUMENTS

WO 2010/146558 A1 12/2010

OTHER PUBLICATIONS

"Adobe Premier 6.0—User Guide", Adobe Systems Incorporated, Published in 2000, Specific pages of interest—44, 55, 56, 139, 240, 244,326, 329, and 362. (Entire manual is 402 pages).
"VideoStudioX4 Pro User Guide", Corel Corp, Published in 2011, Specific pages of interest—2, 67, 78, and 93. (Entire manual is 184 pages).
"Vegas Pro 10 User Manual", Sony, Published May 6, 2011, Chapters/Pages of interest—Chapter 9, p. 168; Chapter 10, p. 183; Chapter 19, p. 321 and Chapter 20, p. 354. Entire manual is 564 pages, and can be downloaded from: http://www.sonycreativesoftware.com/download/manuals/vegaspro10.

* cited by examiner

*Primary Examiner* — William C Vaughn, Jr.
*Assistant Examiner* — Daniel Tekle
(74) *Attorney, Agent, or Firm* — Moser Taboada

(57) ABSTRACT

A computer implemented method and apparatus for defining an event schedule comprises displaying at least three objects representing events, where a first event schedule is defined using a plurality of line segments interconnecting the at least three objects. Each line segment interconnects two objects enabling at least one line segment to be redirected to connect a different object, upon redirection of the at least one line segment, automatically reordering sequence of the events in the first event schedule to form a second event schedule.

20 Claims, 5 Drawing Sheets

METHOD AND APPARATUS FOR DEFINING AN EVENT SCHEDULE

BACKGROUND OF THE INVENTION

1. Field of the Invention

Embodiments of the present invention generally relate to editing of video sequences and, more particularly, to a method and apparatus for defining an event schedule such as a pan and/or zoom schedule used to create a video sequence.

2. Description of the Related Art

To increase impact and attractiveness of an image display, an image (e.g., still photograph or single video frame) may be presented as a video sequence including pan and/or zoom effects with respect to objects in the image. For example, a story may be related from a single image by focusing on one portion of the image (i.e., a focus frame), then panning to another focus frame, focusing on that portion of the image, and subsequently panning and focusing on multiple other focus frames. Zooming (in or out) on a portion of the image further enhances the viewer experience. This effect is commonly known as the "Ken Burns Effect".

One conventional approach for creating such video sequences uses a text interface to identify and sequence object(s) such as focus frames, and specify pan effect and/or zoom effect with respect to the focus frames. In a video editing tool, such as ADOBE PREMIERE® ELEMENTS™ available from Adobe Systems, Inc., each focus frame is represented by a rectangular box circumscribing an object within the image. For example, an author of such video sequences numbers the focus frames through text input in the order that reflects the desired pan and/or zoom sequence. If the user desires to change the pan and/or zoom sequence, the text based schedule needs to be altered to describe a new pan and/or zoom sequence. In general, such text based scheduling techniques are not intuitive. Furthermore, reordering pan and/or zoom sequences may cause panning times between two objects to be either too slow or too quick, and result in a less than optimal viewing experience.

Therefore, there is a need for improved method and apparatus for defining an event schedule such as a pan and/or zoom schedule used to create a video sequence.

SUMMARY OF THE INVENTION

Embodiments of the present invention generally relate to a method and apparatus for defining an event schedule. In an embodiment, a computer implemented method of defining an event schedule comprises displaying at least three objects representing events, where a first event schedule is defined using a plurality of line segments interconnecting the at least three objects. Each line segment interconnects two objects enabling at least one line segment to be redirected to connect a different object, upon redirection of the at least one line segment, automatically reordering the sequence of the events in the first event schedule to form a second event schedule.

Figure 1:
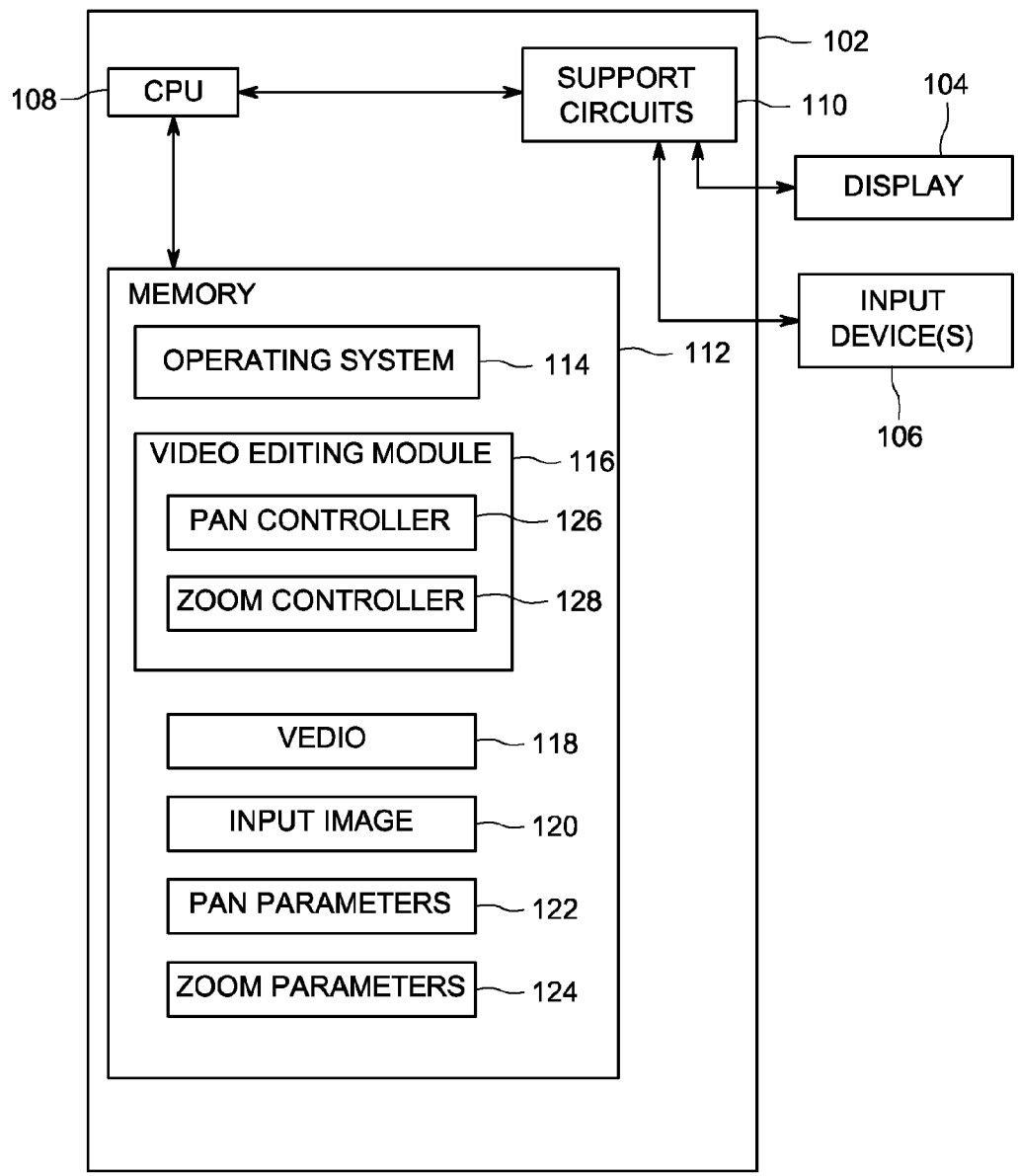
FIG. 1 depicts a block diagram of a computing system for defining an event schedule according to one or more embodiments.

While the method and apparatus is described herein by way of example for several embodiments and illustrative drawings, those skilled in the art will recognize that the method and apparatus for defining an event schedule is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for defining an event schedule as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for defining an event schedule. In one embodiment, the event schedule is a pan and/or zoom schedule used to control panning and/or zooming with respect to focus frames within an image. Within an image display, a line segment interconnecting two focus frames defines a first pan schedule. By selecting the line segment and repositioning an end onto a different focus frame, a second pan schedule is automatically created that reflects a changed sequence of focus frames.

Various embodiments of an apparatus and method for defining an event schedule are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the present invention provide a method and apparatus for defining or redefining event schedules such as a pan schedule and/or zoom schedule in an intuitive manner for a user, while substantially preserving the intended viewing experience of the pan and/or zoom schedule. Advantageously, embodiments of the present invention provide the user the ability to define pan and zoom schedules intuitively using familiar drag, drop and resize actions. The timing of pan schedule and/or zoom schedule is recalculated based on the reordered sequence of objects, or the change in size of the zoomed objects. Due to the intuitive nature of defining pan and/or zoom schedules, the user is able to envision the viewer experience in an intuitive and predictable manner.

FIG. 1 depicts a computing system 100 for defining an event schedule such as a pan and/or zoom schedule for a video sequence, according to one or more embodiments. The computing system 100 illustrates computer 102, a display 104, and input device(s) 106. The input device(s) 106 allow a user or a author of a video sequence to provide inputs to the computer 102 for defining event schedules associated with an image.

The computer 102 is a type of computing device (e.g., a laptop, a desktop, a Personal Digital Assistant (PDA), a tablet, a mobile phone and/or the like) known to one of ordinary skill in the art. The authoring device 102 comprises a Central Processing Unit (CPU) 108, support circuits 110, and a memory 112. The CPU 108 may comprise one or more commercially available microprocessors or microcontrollers that facilitate data processing and storage. The various support circuits 110 facilitate the operation of the CPU 108 and include one or more clock circuits, power supplies, cache, input/output circuits, and the like. The memory 112 comprises at least one of Read Only Memory (ROM), Random Access Memory (RAM), disk drive storage, optical storage, removable storage and/or the like. The memory 112 comprises an operating system (OS) 114, a video editing module 116, an input image 120, a video 118, pan parameters 122 and zoom parameters 124. The video editing module 116 further includes a pan controller 126 and a zoom controller 128.

The video editing module 116, for example, ADOBE PREMIERE® ELEMENTS™ available from Adobe Systems Incorporated, San Jose, Calif., is configured to receive an image or a frame of video sequence, for example the input image 118. The image 118 has multiple objects, such as focus frames, for example, faces of people in the image. Using, for example, a pan schedule, the video editing module 116 executes the pan controller 126 to create a video 118 that pans from focus frame to focus frame within the image 120 in accordance with the pan schedule. Similarly, a zoom schedule is used by the zoom controller 128 to control zoom effects at each focus frame. Pan schedules are governed by pan parameters, for example, the pan parameters 122, and zoom schedules are governed by the zoom parameters, for example, the zoom parameters 124. The pan controller 126 is configured to define and modify a pan schedule using pan parameters 122, and the zoom controller 128 is configured to define and modify a zoom schedule using zoom parameters 124. With the pan and zoom schedules, the image 120 is used to form a video sequence 115 containing pan and zoom effects. Advantageously, the video editing module 114 allows for intuitive modification of pan and zoom parameters according to user (author) preferences, and in certain embodiments, recalculates the time between consecutive pan sequences, and the time taken for zooming in to or out of an object.

The display 104 comprises one or more display screens such as LCD, LED, AMOLED that display digital information graphically, for example, the image 118 or the video 120. The input device(s) 106 include one or more devices such as computer mice, keyboards, touch screens, touch screen pens, and other devices and interfaces known in the art.

Figure 2:
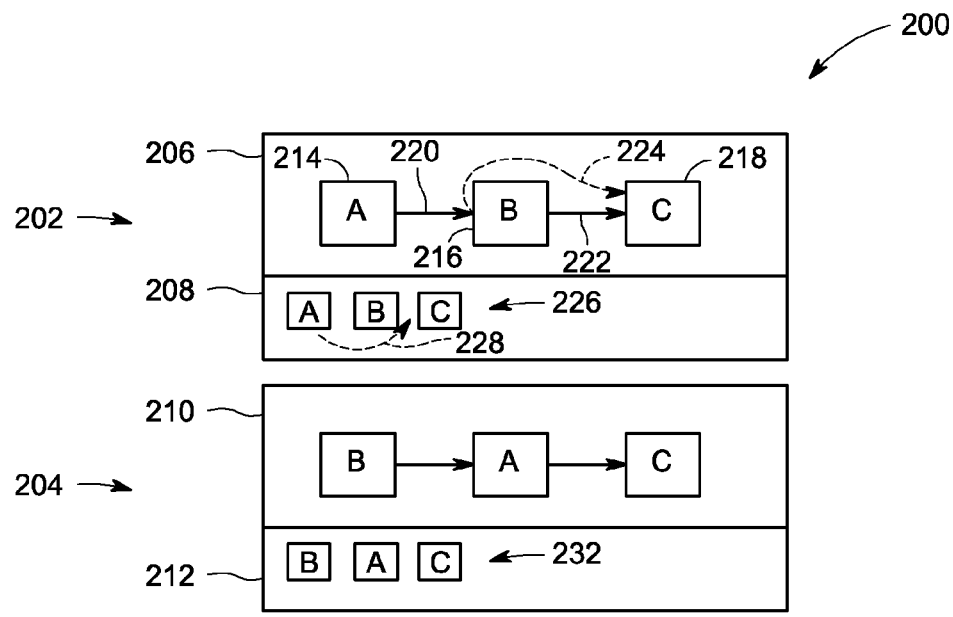
FIG. 2 depicts a display that may be used for defining and/or modifying an event schedule as implemented using the computing system of FIG. 1, according to one or more embodiments.

FIG. 2 depicts a display 200 that may be used for defining or modifying an event schedule as implemented using the computing system of FIG. 1, according to one or more embodiments. The display 200 comprises an image display zone 206 and a thumbnail zone 208. The image display zone 206 displays an image comprising objects A, B and C, and a current event sequence defined from A to B depicted by arrow 220, and from B to C depicted by arrow 222. The thumbnail zone 208 displays the current order sequence of the objects A, B and C, and the object thumbnails 226 appear in the sequence consistent with the current event sequence. The objects 214, 216, 218 are representative of any event that can be executed or performed in a specific order such as panning, zooming, software simulation execution, and/or any other object oriented sequential execution.

A user alters, redefines or modifies the current event schedule to a new event sequence, for example, by dragging the arrow 220 from A to B, to point to C instead of B, as illustrated by the dashed arrow 224. While this operation is performed by the user via a graphical interface, the object thumbnails 226 also rearrange, as indicated by dashed arrow 228 to be consistent with the new event sequence.

The second display 204 comprises an image display zone 210 with the objects A, B and C rearranged in the sequence B, A, C. The sequence is from B to A as depicted by the arrow 230, and from A to C as depicted by the arrow 224. A thumbnail zone 212 displays the object thumbnails 232 in the new event sequence that corresponds to the change in the event sequence of the objects 216, 214, 218. In the illustrated embodiment, event sequence changes such that the arrow 220 from A shifts from B to C, and since C is after B in the event sequence, A is moved in the sequence to be positioned after B, thereby arriving at the event sequence order B, A, C. In another embodiment, the event sequence may be rearranged such that when the arrow 220 from A shifts from B to C, C is moved in the sequence to be positioned before B, thereby arriving at the event sequence order A, C, B.

The objects A, B and C, denoted by numerals 214, 216 and 218 respectively, could be image objects, simulation objects or any other executable object representing an event to be performed. By moving the arrow 220 that interconnects object A and object B, to interconnect object A to object C, the sequence of objects is automatically updated to become B, A, C. If the objects represented a circuit model, computer model, or other functional sequence of operations, the alteration of the interconnections would automatically change the functional sequence of events represented by the objects.

Figure 3:
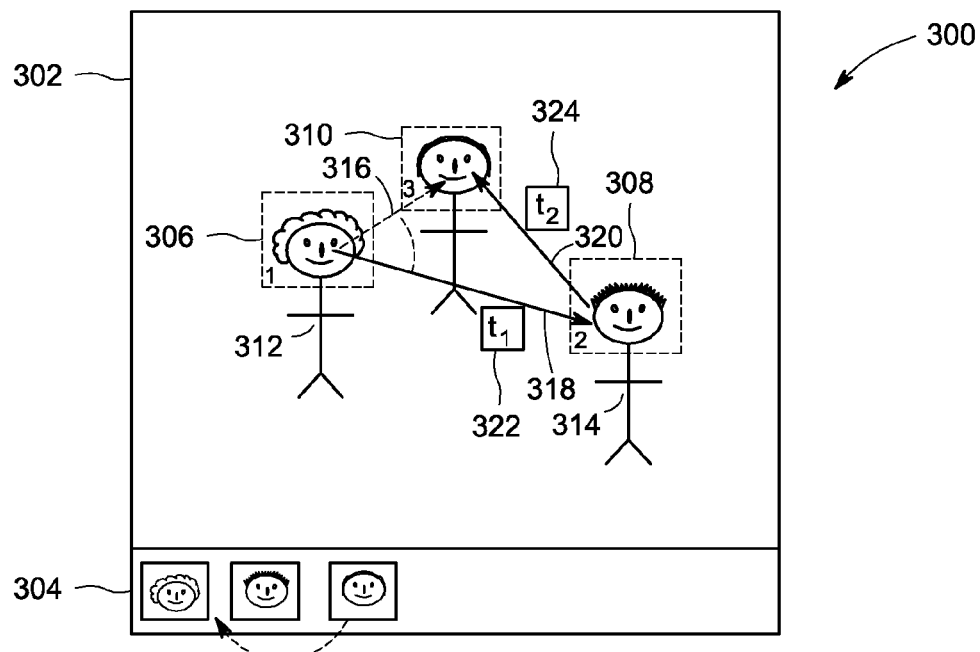
FIG. 3 depicts redefining display that may be used for defining and/or modifying a pan schedule as implemented using the computing system of FIG. 1, according to one or more embodiments.

FIG. 3 depicts a display 300 that may be used for defining or modifying a pan schedule, according to one or more embodiments. The display 300 depicts as implemented using the computing system of FIG. 1 an image frame 302 comprising multiple objects, and a thumbnail zone 304 for depicting the object sequence. For example, the image 302 comprises focus frames of faces of three people comprising objects 1, 2 and 3 denoted by focus frames 306, 308, and 310, respectively. The sequence numbers of each object, that is, 1, 2 and 3 are denoted by numerals 312, 314 and 316, respectively. The line segment interconnecting object 1 to object 2 is denoted by numeral 318, and the line segment interconnecting object 2 to object 3 is denoted by numeral 320. Time taken to pan from object 1 to object 2, pan time t1, is denoted by numeral 322, while time taken to pan from object 2 to object 3, pan time t2, is denoted by numeral 324. Additionally, focus may be held at one or more objects or focus frames for a time duration referred to as a hold time (not shown).

In the embodiment illustrated by FIG. 3, to reorder the pan schedule, a user moves the line segment 318 between the object 1 and the object 2, to be positioned between the object 1 and the object 3, as denoted by the direction of the dashed arrow 328. When the user "clicks" on the line segment 318, the segment becomes an arrow and is capable of being repositioned. For example, the user may drag the segment 318 as arrow 330 from pointing at object 2, to a new position pointing at object 3. On detecting such an operation, the pan controller automatically modifies the pan sequence from 1-2-3, to 1-3-2. The change is also depicted in the thumbnail zone 304 by the dashed arrow 326.

Figure 4:
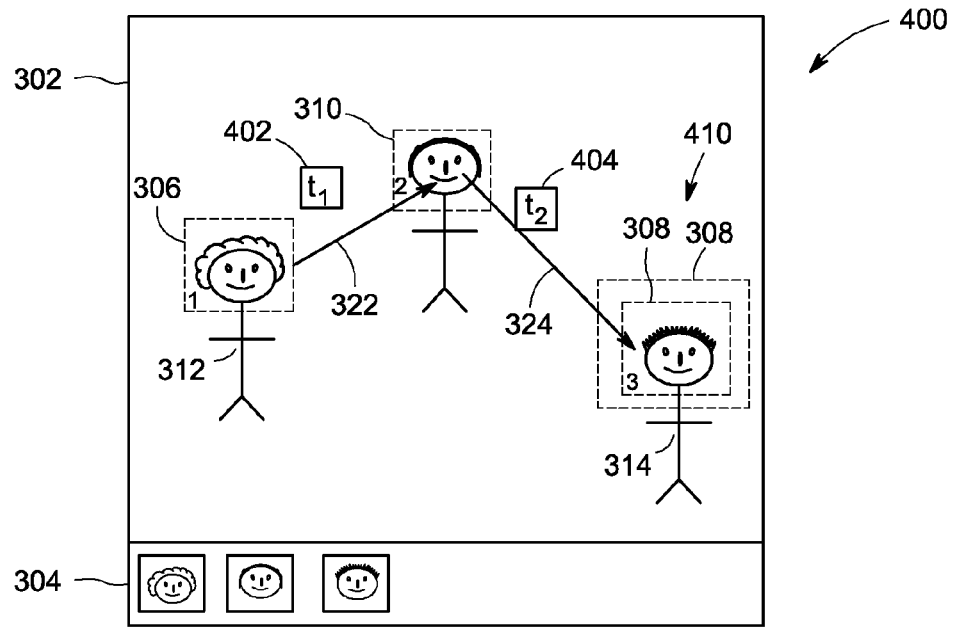
FIG. 4 depicts a redefined display illustrating, a modified pan schedule as implemented using the computing system of FIG. 1, according to one or more embodiments.

FIG. 4 depicts a display 400 illustrating a modified pan schedule as implemented using the computing system of FIG. 1, according to one or more embodiments. Image 402 and thumbnail zone 404 are updated according to the modified pan sequence. For example, the arrow 318 of FIG. 3 interconnecting object 1 to object 2, is redefined in FIG. 4 to connect object 1 to object 3, and the redefined arrow is denoted by numeral 402. Due to the redefinition of the pan sequence of object 1 to object 3, the remainder of the pan sequence readjusts automatically, that is, the arrow 320 of FIG. 3 interconnecting object 2 to object 3 automatically redefines to arrow 404 in FIG. 4 and interconnects object 3 to object 2. Therefore, the pan sequence of FIG. 3, which pans between objects in the order 1, 2, 3 updates to the new pan sequence of FIG. 4 which pans between objects in the order 1, 3, 2 denoted by numerals 312, 314 and 316, respectively. The thumbnail zone 304 illustrates a reordered thumbnail sequence consistent with the modified pan sequence.

FIG. 4 illustrates that the pan time t1 within field 322 associated with the arrow 318 of FIG. 3, is not modified. However, the arrow 318 has transformed to arrow 402. While pan time t1 is appropriate for the pan distance between objects 1 and object 2 as displayed in FIG. 3, in FIG. 4, the pan distance between object 1 and object 3 is different, for example, visibly shorter than the pan distance between object 1 and object 2. Therefore, for panning between object 1 and object 3, the pan time t1 may be undesirably long. According to one or more embodiments and described in detail with respect to FIG. 6 below, an average pan time is calculated for all pan sequences and adjusted with respect to the distance between objects, and the altered pan time is then automatically applied to redefined pan sequences, thus preserving the overall viewer experience. The user may reconfigure the pan time, if desired, by selecting and editing on the pan time t1 in field 322.

According to another embodiment, the objects may be zoomed, and therefore a zoom schedule is utilized to define the zoom effect. FIG. 4 illustrates the object 2 being zoomed, for example, from an original size of focus frame 308, to a new zoomed size of focus frame 408. In the embodiment illustrated by FIG. 4, focus frame 308 is increased in size to become focus frame 408, for example, by selecting the focus frame 308 and using a simple drag operation to resize the rectangle to focus frame 408. While displaying the zoom sequence, the degree of zoom is altered by changing the size of the focus frame 308 as represented by the area of the rectangle defining the focus frame 308. For example, the zoom in or out ratio is defined by the ratio of the area of focus frame 408 to the area of focus frame 308. If the ratio of focus frames is greater than one, the display zooms in on the focus frame, while if the ratio of focus frames is less than one, the display zooms out of the focus frame. The user may define a zoom time t3 in field 410 to define the time required to zoom from an original size to a zoomed size.

While FIGS. 3 and 4 illustrate redefining of pan schedules, that is, altering an existing pan schedule for a video sequence associated with an image, those skilled in the art will appreciate that same techniques are applicable for defining an original pan schedule for an image. Instead of changing the position and/or directions of arrows interconnecting objects, new arrows are defined to interconnect various objects in the image. All other operations remain as described above.

Figure 5:
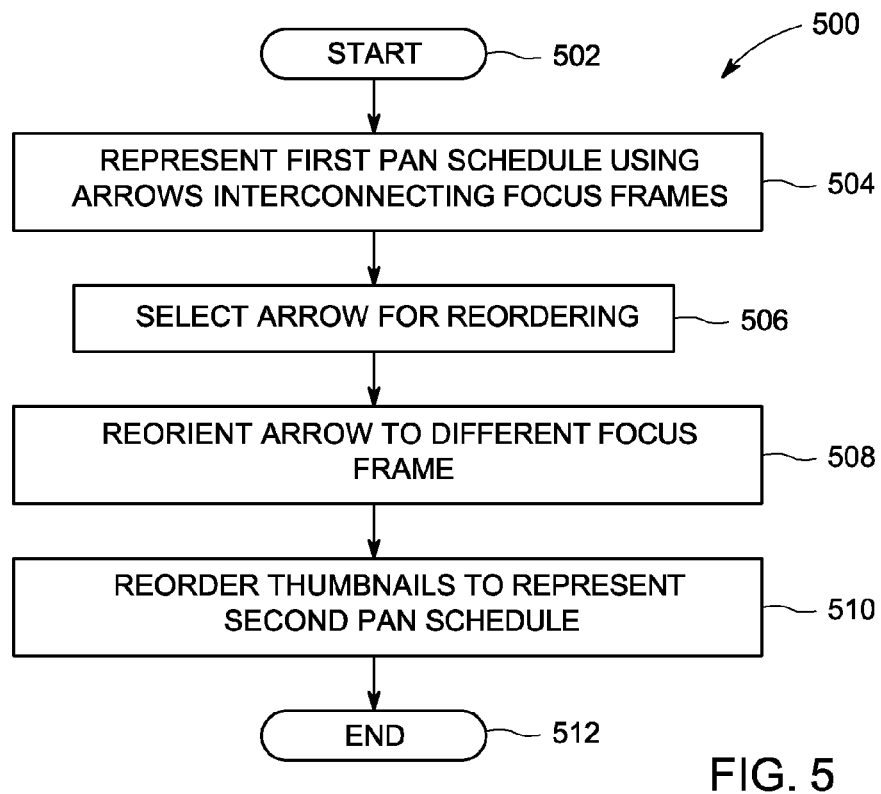
FIG. 5 depicts a flow diagram of a method for modifying a pan schedule as an exemplary implementation of the pan controller of FIG. 1, according to one or more embodiments.

FIG. 5 depicts a flow diagram of a method 500 of modifying a pan schedule as implemented as the pan controller 126 of FIG. 1, according to one or more embodiments. The method 500 represents execution of the pan controller 126 using the computing system 100 or a computer of FIG. 8, according to an embodiment of the invention. The method 500, according to one embodiment, modifies a pan schedule for an image.

The method 500 starts at step 502, and at step 504, a first pan schedule is represented using line segments interconnecting focus frames, for example, as illustrated with respect to FIGS. 3 and 4. At step 506, for reordering the pan sequence, an arrow representing interconnect between two focus frames is selected, and at step 508, the arrow is reoriented to a focus frame different from one of the two focus frames. The pan schedule is reordered consistent to the reorientation of the arrow and, at step 510, thumbnails representing the pan schedule are reordered. The method 500 ends at step 512.

Figure 6:
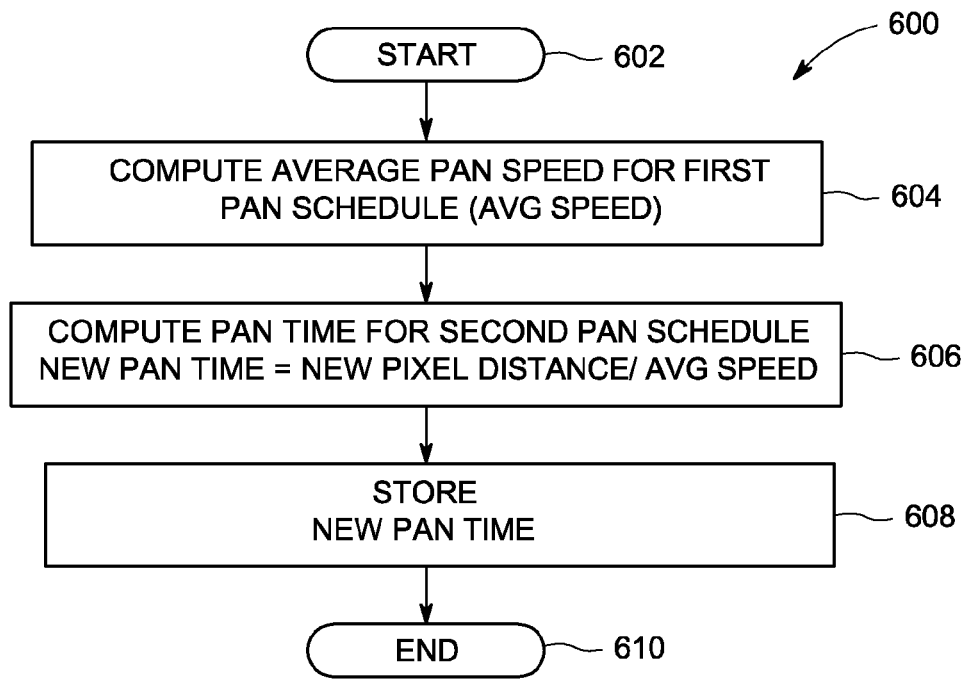
FIG. 6 depicts a flow diagram of a method for controlling the pan speed used for panning during a pan schedule as an exemplary implementation of a portion of the pan controller of FIG. 1, according to one or more embodiments.

FIG. 6 depicts a flow diagram of a method 600 illustrating operation of the pan controller 126 of FIG. 1, according to one or more embodiments. The method 600, according to one embodiment, controls the pan speed used for panning between objects in a pan schedule. For example, in order to maintain consistency of the viewing experience, an average pan speed used in the first pan schedule is maintained for the second pan schedule.

The method 600 starts at step 602, and at step 604 an average speed of the first pan schedule is calculated. For example, in FIG. 3, if the pixel (pan) distance between object 1 and object 2 is denoted by d1, and the pixel (pan) distance between object 2 and object 3 is denoted by d2, then the average pan speed (avgPanSpeed) is calculated as:

$$avgPanSpeed=(d1+d2)/(t1+t2)$$

At step 606, the method 600 calculates pan times for panning according to a second pan schedule. For example, in FIG. 4, the pan time (newPanTime) between object 1 and object 3, when the pixel (pan) distance between object 1 and object 3 is denoted by d3, is calculated as:

$$newPanTime=d3/avgPanSpeed$$

Pan times for panning between multiple objects are calculated in a similar manner. At step 608, the method 600 stores the newPanTime for various pan sequences of the second pan schedule. The newPanTime, the pan times t1, t2, pixel distances d1, d2 are stored as pan parameters 122 of FIG. 1. The method 600 ends at step 610. Hold time for each object may be preserved, or an average hold time (calculated by simply averaging all hold times from the first pan schedule) may be used in the second pan schedule.

Figure 7:
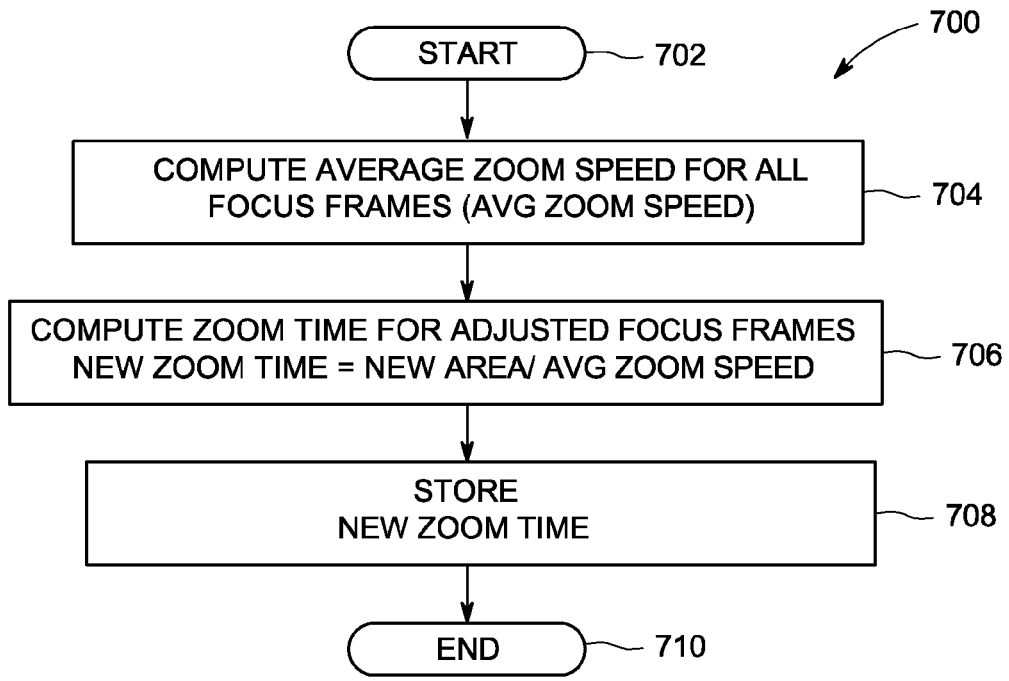
FIG. 7 depicts a flow diagram of a method for controlling the zoom speed used during zooming as an exemplary implementation of a portion of the zoom controller of FIG. 1, according to one or more embodiments.

FIG. 7 depicts a flow diagram of a method 700 illustrating operation of the zoom controller 128 of FIG. 1, according to one or more embodiments. The method 700, according to one embodiment, controls the zoom speed used to zoom on one or more objects according to a zoom schedule. For example, in order to maintain consistency of the viewing experience, an average zoom speed used in the first zoom schedule is maintained for the second zoom schedule.

The method 700 starts at step 702, and at step 704 an average zoom speed for all focus frames of the first zoom schedule is calculated. For example, in FIG. 4, for object 2, if area of the focus frame 408 is denoted by A2, and are of the focus frame 308 is denoted by A1, and the time taken to zoom is denoted by t4, then the average zoom speed (avgZoomSpeed) is calculated as:

$$avgZoomSpeed=((A2-A1)/A1)/t4$$

where (A2−A1)/A1 denotes standardized zoom distance. In other embodiments, multiple objects are zoomed in the first zoom schedule, and in such embodiments standardized zoom distances for each of the multiple objects are averaged to calculate the average zoom speed. At step 706, the method 700 calculates zoom times for zooming according to a second zoom schedule. For example, if a zoom size for a focus frame is adjusted from a first zoom size having an area A3 to a new zoom size having an area A4, the zoom time (newZoomTime) for zooming according to the new zoom schedule is calculated as:

$$newZoomTime=((A4-A3)/A3)/avgZoomSpeed$$

Zoom times for zooming multiple objects are calculated in a similar manner. At step 708, the method 700 stores the newZoomTime for various objects of the second zoom schedule. The newzoomTime, the zoom times t4, focus frame areas A1, A2, A3, A4 are stored as zoom parameters 124 of FIG. 1. The method 700 ends at step 710.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 8:
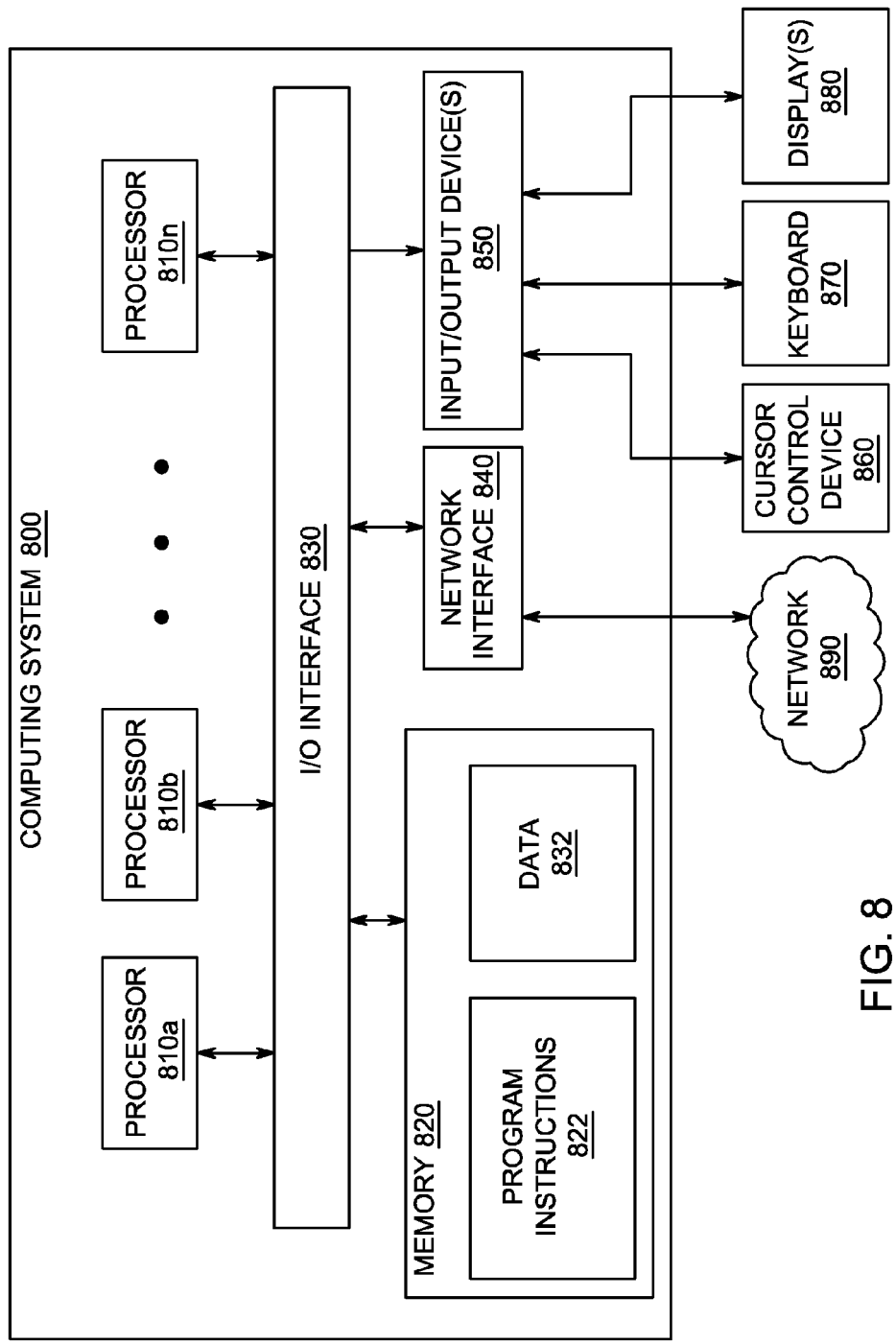
FIG. 8 depicts a computer system that can be utilized in various embodiments of the present invention, according to one or more embodiments.

FIG. 8 depicts a computer system that can be utilized in various embodiments of the present invention, according to one or more embodiments.

Various embodiments of an apparatus and method for defining event schedules, as described herein, may be executed on one or more computer systems, which may interact with various other devices. One such computer system is computer system 800 illustrated by FIG. 8, which may in various embodiments implement any of the elements or functionality illustrated in FIGS. 1-7. In various embodiments, computer system 800 may be configured to implement methods described above. The computer system 800 may be used to implement any other system, device, element, functionality or method of the above-described embodiments. In the illustrated embodiments, computer system 800 may be configured to implement methods 500, 600 and 700, as processor-executable executable program instructions 822 (e.g., program instructions executable by processor(s) 810) in various embodiments.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In various embodiments, any of components may be utilized by the system to receive user input described above. In various embodiments, a user interface (e.g., user interface) may be generated and displayed on display 880. In some cases, it is contemplated that embodiments may be implemented using a single instance of computer system 800, while in other embodiments multiple such systems, or multiple nodes making up computer system 800, may be configured to host different portions or instances of various embodiments. For example, in one embodiment some elements may be implemented via one or more nodes of computer system 800 that are distinct from those nodes implementing other elements. In another example, multiple nodes may implement computer system 800 in a distributed manner.

In different embodiments, computer system 800 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x96, PowerPC, SPARC, or MIPS ISAs, or any other suitable ISA. In multiprocessor systems, each of processors 810 may commonly, but not necessarily, implement the same ISA.

System memory 820 may be configured to store program instructions 822 and/or data 832 accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 820. In other embodiments, program instructions and/or data may be received, sent or stored upon different types of computer-accessible media or on similar media separate from system memory 820 or computer system 800.

In one embodiment, I/O interface 830 may be configured to coordinate I/O traffic between processor 810, system memory 820, and any peripheral devices in the device, including network interface 840 or other peripheral interfaces, such as input/output devices 850, In some embodiments, I/O interface 830 may perform any necessary protocol, timing or other data transformations to convert data signals from one components (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network (e.g., network 890), such as one or more external systems or between nodes of computer system 800. In various embodiments, network 890 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

In some embodiments, the illustrated computer system may implement any of the methods described above, such as the methods illustrated by the flowcharts of FIGS. 5-7. In other embodiments, different elements and data may be included.

Those skilled in the art will appreciate that computer system 800 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method of defining an event schedule comprising:
   displaying in an image at least three objects representing events, where a first event schedule is defined using a first displayed line segment interconnecting a first and a second object within the at least three objects and using a second displayed line segment interconnecting one of the first and second objects with a third object within the at least three objects;
   enabling at least one displayed line segment to be redirected to connect to a different object within the at least three objects; and
   upon redirection of the at least one displayed line segment, automatically reordering the sequence of events in the first event schedule to form a second event schedule.

2. The method of claim 1 wherein each event schedule comprises a pan schedule defining a different sequence for the at least three objects within the image to be panned to form a video sequence.

3. The method of claim 1 wherein each event schedule comprises a zoom schedule defining a different sequence for the at least three objects within the image to be zoomed to form a video sequence.

4. A computer implemented method of defining a pan schedule for a video sequence comprising:
   displaying at least three objects, where a first pan schedule including the at least three objects as an ordered sequence is defined using a plurality of displayed line segments interconnecting the at least three objects;
   enabling at least one displayed line segment to be redirected away from one object within the at least three objects to connect to a different object within the at least three objects; and
   upon redirection of the at least one displayed line segment, automatically reordering the sequence of objects in the first pan schedule to form a second pan schedule for a video sequence.

5. The method of claim 4 wherein each object is contained within a focus frame.

6. The method of claim 4 wherein, upon enabling the at least one displayed line segment to be redirected, the at least one line segment is displayed as an arrow.

7. The method of claim 4 further comprising calculating an average pan speed based on time taken to pan between two consecutive objects in an image, and pixel distance between the two consecutive objects as defined in the first pan schedule.

8. The method of claim 7, wherein automatically reordering the objects in the first pan schedule further comprises calculating a new pan time based on a pixel distance corresponding to the at least one redirected segment, and the average pan speed.

9. The method of claim 5 further comprising defining a zoom schedule by selecting a focus frame associated with at least one object, the focus frame having an original size; resizing the focus frame to a zoom size; and associating a zoom time for achieving the zoom size.

10. The method of claim 9 further comprising calculating an average zoom speed based on time taken to zoom in or out of the at least one object, and the ratio of zoom size and original size.

11. The method of claim 10 further comprising automatically redefining zoom schedule by calculating a new zoom time based on a ratio of desired zoom size and the original size, and the average zoom speed.

12. A non-transitory computer readable medium for storing computer instructions that, when executed by at least one processor cause the at least one processor to perform a method of defining a pan schedule for a video sequence comprising:
   displaying at least three objects within an image, where a first pan schedule including the at least three objects as an ordered sequence is defined using a plurality of displayed line segments interconnecting the at least three objects;
   enabling at least one displayed line segment to be redirected away from one object within the at least three objects to connect to a different object;

upon redirection of the at least one displayed line segment, automatically reordering the sequence of objects in the first pan schedule to form a second pan schedule.

13. The non-transitory computer readable medium of claim 12 wherein each object is contained within a focus frame.

14. The non-transitory computer readable medium of claim 12 wherein, upon enabling the at least one line segment to be redirected, the at least one line segment becomes an arrow.

15. The non-transitory computer readable medium of claim 12 further comprising calculating an average pan speed based on time taken to pan between two consecutive objects, and pixel distance between the two consecutive objects as defined in the pan schedule.

16. The non-transitory computer readable medium of claim 15, wherein automatically reordering the objects in the first pan schedule further comprises calculating a new pan time based on a pixel distance corresponding to the at least one redirected segment, and the average pan speed.

17. The non-transitory computer readable medium of claim 13 further comprising defining a zoom schedule by selecting a focus frame associated with at least one object, the focus frame having an original size, resizing the focus frame to a zoom size, and associating a zoom time for achieving the zoom size.

18. The non-transitory computer readable medium of claim 17 further comprising calculating an average zoom speed based on time taken to zoom in or out of the at least one object, and the ratio of zoom size and original size.

19. The non-transitory computer readable medium of claim 18 further comprising automatically redefining zoom schedule by calculating a new zoom time based on a ratio of desired zoom size and the original size, and the average zoom speed.

20. Apparatus for defining a pan schedule for a video sequence comprising:
- a computer system having a display for displaying at least three objects within an image, where a first pan schedule including the at least three objects as an ordered sequence, is defined using a plurality of displayed line segments interconnecting the at least three objects;
- the computer system, in response to manipulation of an input device, enabling at least one displayed line segment to be redirected away from one object within the at least three objects to connect to a different object;
- upon redirection of the at least one displayed line segment, automatically reordering the sequence of objects in the first pan schedule to form a second pan schedule.

* * * * *